US010527870B2

(12) United States Patent
Navvab

(10) Patent No.: US 10,527,870 B2
(45) Date of Patent: Jan. 7, 2020

(54) EYEWEAR FOR AUTOMATICALLY DETECTING AND BLOCKING SOURCES OF GLARE

(71) Applicant: The Regents of The University of Michigan, Ann Arbor, MI (US)

(72) Inventor: Mojtaba Navvab, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/935,329

(22) Filed: Mar. 26, 2018

(65) Prior Publication Data

US 2018/0284485 A1    Oct. 4, 2018

Related U.S. Application Data

(60) Provisional application No. 62/480,579, filed on Apr. 3, 2017.

(51) Int. Cl.
*G02C 7/10* (2006.01)
*G02F 1/133* (2006.01)

(52) U.S. Cl.
CPC .......... *G02C 7/101* (2013.01); *G02F 1/13318* (2013.01); *G02F 2001/13312* (2013.01)

(58) Field of Classification Search
CPC .................................. G02C 7/10; G02C 7/101
USPC ........ 351/44, 45, 47, 159.49, 159.59, 159.6, 351/159.63
See application file for complete search history.

(56) References Cited

U.S. PATENT DOCUMENTS

| 4,848,890 | A | * | 7/1989 | Horn ................. A61F 9/023 351/44 |
| 5,184,156 | A | | 2/1993 | Black et al. |
| 5,552,841 | A | | 9/1996 | Gallorini et al. |
| 5,671,035 | A | | 9/1997 | Barnes |
| 7,585,068 | B2 | | 9/2009 | Mullin et al. |
| 7,586,079 | B2 | | 9/2009 | Mullin et al. |
| 9,411,174 | B2 | | 8/2016 | Burt et al. |
| 2015/0323795 | A1 | * | 11/2015 | Alton ............... G02B 27/0172 349/11 |

FOREIGN PATENT DOCUMENTS

| EP | 1618434 A4 | 9/2006 |
| JP | S6161128 A | 3/1986 |

OTHER PUBLICATIONS

International Search Report and Written Opinion of the International Searching Authority issued in PCT/US2018/024990, dated Jul. 17, 2018; ISA/KR.

(Continued)

*Primary Examiner* — Darryl J Collins
(74) *Attorney, Agent, or Firm* — Harness, Dickey & Pierce, P.L.C.

(57) ABSTRACT

An eyewear system for automatically detecting and blocking a source of glare from at least one eye of a user. The eyewear system having a first transparent LCD lens; a second transparent LCD lens having a plurality of pixel positions, each of the plurality of pixel positions configured to activate to block the source of glare from the eye of the user; a transparent material with a view of the source of glare; and a control system for detecting the source of the glare and activating at least one of the plurality of pixel positions.

13 Claims, 2 Drawing Sheets

(56) References Cited

OTHER PUBLICATIONS

Hurley, "Liquid Crystal Displays for Pixelated Glare Shielding Eyewear," Dissertation for Kent State University, Aug. 2010.
Bridget Borgobello, "Dynamic Eye Sunglasses Use Moving LCD Spot to Reduce Glare," New Atlas, Nov. 28, 2010, https://newatlas.com/electronic-sunglasses-dynamic-eye/17087/.
Elizabeth Svoboda, "2011 Invention Awards: Dynamically Glare-Blocking LCD Sunglasses," Popular Science, Jun. 2, 2011, https://www.popsci.com/diy/article/2011-May2011-invention-awards-glare-killer.

* cited by examiner

EYEWEAR FOR AUTOMATICALLY DETECTING AND BLOCKING SOURCES OF GLARE

CROSS-REFERENCE TO RELATED APPLICATIONS

This application claims the benefit of U.S. Provisional Application No. 62/480,579, filed Apr. 3, 2017. The entire disclosure of the above application is incorporated herein by reference.

FIELD

The present disclosure relates to eyewear and, more particularly, relates to eyewear that automatically detects and blocks sources of glare.

BACKGROUND AND SUMMARY

This section provides background information related to the present disclosure which is not necessarily prior art. This section provides a general summary of the disclosure, and is not a comprehensive disclosure of its full scope or all of its features.

It is well known that sources of intense light can result in reduced visibility. This can particularly occur while driving in an easterly or westerly direction during sunrise or sunset. In such situations, a driver may suffer significant visual disability. However, this can also occur from any other intense source of light, such artificial lights, reflections, and the like.

Unfortunately, standard sunglasses cannot account for specific glare sources and can have a contributory effect in reducing visibility to ancillary areas, such as to the side of the light source. Often times, a user must shift their view, position, or employ obstruction devices (e.g. sunshade) to counteract these effects.

The development of micro cameras and liquid crystal displays (LCDs) suggests a potential solution to this problem. Specifically, according to the principles of the present teachings, eyewear is provided that is capable of detecting and blocking such sources of light. In some embodiments, the eyewear includes a micro camera directly mounted on a pair of eyeglasses, goggles, or other eyewear, to detect and block the sources of light.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
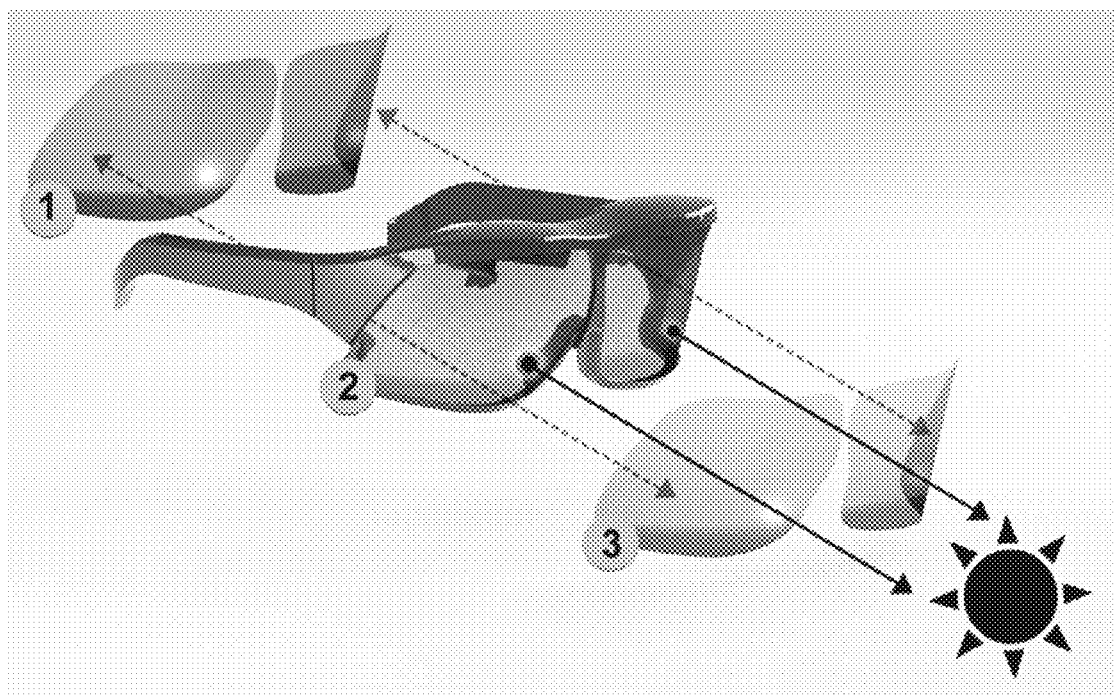
Figure 2:
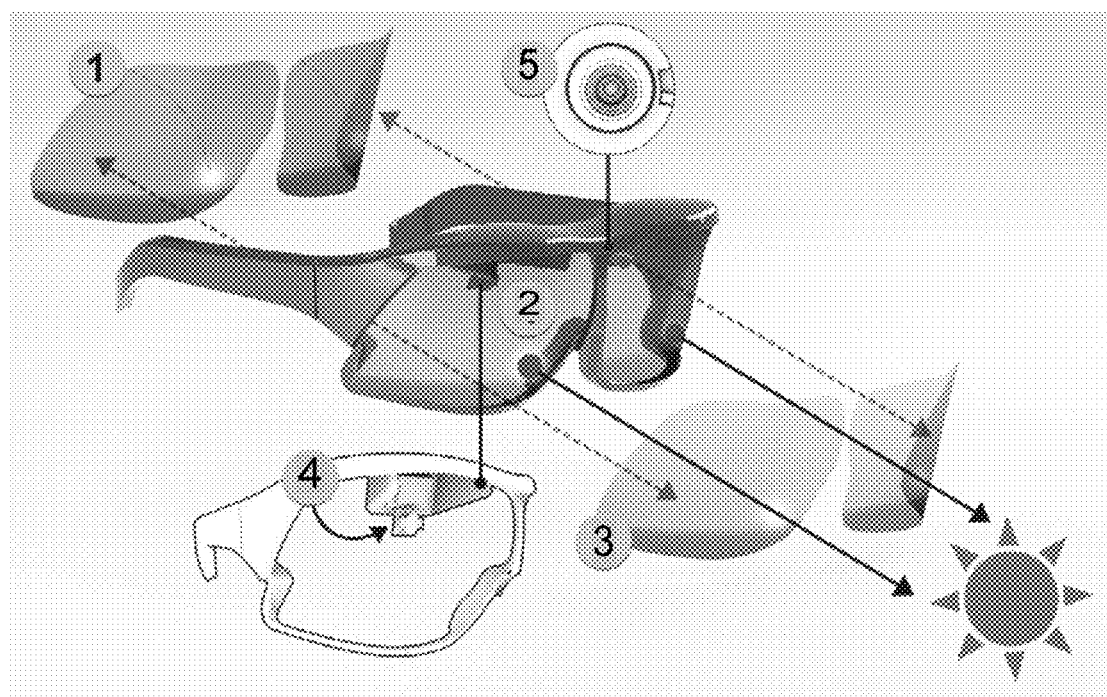

FIG. 1 illustrates an eyewear system according to some embodiments of the present teachings; and FIG. 2 illustrates an eyewear system according to some embodiments of the present teachings having a camera and mirror system.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g. "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, in some embodiments, the prototype system utilizes a smart phone display and camera. The light source for the display would need to be stripped off the back of the display. Removing the light source should dramatically reduce power demand, which would aid in making a device with low enough weight to be wearable. Processing power requirements also appear to be minimal, but might require scavenging a separate chip from some other source.

This integrated camera measures the luminance of the view, and discerns the angular location of potential glare sources, such as the sun, as well as glare from environmental conditions, such as snow covered ground or reflective surface. The disclosed technology is eyewear that automatically detects and blocks sources of glare, e.g., the sun or reflected sunlight on snow.

It darkens a small circle (2.5 to 3 mm) to block out the glare source while preserving overall vision. In some embodiments, this is done by mounting a micro camera directly on a pair of eyeglasses, goggles, or other eyewear and also by replacing any lenses with a transparent LCD panel.

It has potential application in non-prescription eyewear, military eyewear, and medical eyewear.

In the simplest implementation, the front lens of the glasses, goggles, or eyewear is replaced with a transparent LCD panel. The eyes are assumed to look straight-ahead through the glasses, so there is a fixed angular relationship between the center of the pupil and any specific location on the LCD panel. This is similar to the way variable focus lens are used. For a variable focus lens you have to move your head, and not your eyes, if you want to maintain a fixed focal distance. The LCD controller darkens a 2.5 to 3 mm circle of pixels centered on the line of sight to the glare source. This circle is larger than the angular size of a glare source like the sun, and at least as large as the size of the pupil to block all the light at a given angle. At 2 cm from the pupil of the eye, a 3 mm spot subtends approximately 8.5°. This means that the closest approach of a glare source to the line of sight that still permits vision along the line of sight is slightly over 4.25°.

As illustrated in FIG. 1, in some embodiments, a first transparent LCD 1, a second transparent LCD 2 with circle of pixels centered on the line of sight to block the glare source, and a transparent glass 3 with the view of glare source in line of sight are provided. In this embodiment, two LCD panel lenses are needed. A minimum 3 mm circle is still required to block the glare source, but in this case the circle is created by the overlap of two patterns on the two lenses. The patterns can be a simple set of stripes on each lens. Also changing the relative phase of the two arrays of stripes changes the angles which light can and cannot pass through the two arrays. This means that the 3 mm circle can partially overlap the line of sight, yet still allow a view along the line of sight, while blocking the view of the glare source.

As illustrated in FIG. 2, in some embodiments, transparent LCD 1, a camera and mirror housing 4 for tracking eye movement, as needed, is located at a camera lens position 5, a transparent LCD 2 with a composite set of pixels (strips) converted to a circle shape while blocking the glare source, and a transparent glass 3 with the view of glare source in line of sight is provided.

To get the sun blocker effect, the stripes or other pattern elements have to be half or less the size of the pupil. At the same time, there is a limit on how small the stripes can be due to the minimum size of the pixels available with current displays. For example, the Apple Retina display has a pixel size of about 0.1 mm. If the blocking circle is made of stripes that are 1 mm wide, then the relative position of the arrays can be adjusted in 10 discrete steps. If the two lenses are separated by 1 cm, the lines block the light with a periodicity of 5.7° over the angular width of the circle. Shifting one array by 0.1 mm will change the starting point of the periodic blocking by 0.57°. This means that vision along the line of sight can approach to within approximately 0.6° of a glare source in this example.

It needs to be noted that the sun has an angular extent of about 0.5°. If the dark and open stripes are each 1 mm in width, then there will be light leakage around the blocking angle. This can be fixed by making the dark stripe 1.1 mm in width and the open stripe 0.9 mm in width. This results in light blockage over a 1° span, which is sufficient to block the sun.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An eyewear system for automatically detecting and blocking a source of glare from at least one eye of a user, the eyewear system comprising:
   a first transparent LCD lens having a first plurality of pixel positions, each of the first plurality of pixel positions configured to activate to block at least a portion of the source of glare from the eye of the user;
   a second transparent LCD lens having a second plurality of pixel positions, each of the second plurality of pixel positions of the second transparent LCD lens configured to activate to block at least a portion of the source of glare from the eye of the user;
   a camera system configured to track movement of the eye of the user; and
   a control system configured to detect the source of the glare and eye movement and activate at least one of the first plurality of pixel positions to define a first pixel pattern and at least one of the second plurality of pixel positions to define a second pixel pattern, the first pixel pattern and the second pixel pattern at least partially overlap each other to inhibit transmission of light from the source of glare to the eye of the user.

2. The eyewear system according to claim 1 wherein the first transparent LCD lens and the second transparent LCD lens are configured to be aligned with a center of a pupil of the eye of the user.

3. The eyewear system according to claim 1 wherein the first pixel pattern and the second pixel pattern together define an area greater than an area of the source of the glare upon the first transparent LCD lens and the second transparent LCD lens.

4. The eyewear system according to claim 1 wherein each of the first pixel pattern on the first transparent LCD lens and the second pixel pattern on the second transparent LCD lens separately has a width less than a width of a pupil opening of the user.

5. The eyewear system according to claim 4 wherein each of the first pixel pattern and the second pixel pattern is a strip.

6. The eyewear system according to claim 4 wherein each of the first pixel pattern and the second pixel pattern is a single element of a multi-element pattern.

7. The eyewear system according to claim 1 further comprising:
a transparent material with a view of the source of glare coupled to at least one of the first transparent LCD lens and the second transparent LCD lens.

8. An eyewear system for automatically detecting and blocking a source of glare from at least one eye of a user, the eyewear system comprising:
a first transparent LCD lens having a first plurality of pixel positions, each of the first plurality of pixel positions of the first transparent LCD lens configured to activate to block at least a portion of the source of glare from the eye of the user;
a second transparent LCD lens having a second plurality of pixel positions, each of the second plurality of pixel positions of the second transparent LCD lens configured to activate to block at least a portion of the source of glare from the eye of the user;
a transparent material with a view of the source of glare;
a camera system configured to track movement of the eye; and
a control system configured to detect the source of the glare and movement of the eye of the user and activate at least one of the first plurality of pixel positions and at least one of the second plurality of pixel positions in an overlapping pattern.

9. The eyewear system according to claim 8 wherein the first transparent LCD lens is configured to be aligned with a center of a pupil of the at least one eye.

10. The eyewear system according to claim 8 wherein the overlapping pattern defines an area greater than an area of the source of the glare.

11. The eyewear system according to claim 8 wherein the overlapping pattern has a width less than a width of a pupil opening of the user.

12. The eyewear system according to claim 11 wherein the activated at least one of the first plurality of pixel positions forms a strip.

13. The eyewear system according to claim 11 wherein the activated at least one of the first plurality of pixel positions is a single element of a multi-element pattern.

* * * * *